United States Patent [19]

Shtarkman

[11] Patent Number: 4,869,476

[45] Date of Patent: Sep. 26, 1989

[54] ELECTRICALLY CONTROLLED VISCOUS ELASTIC SPRING

[75] Inventor: Emil M. Shtarkman, Southfield, Mich.

[73] Assignee: TRW Inc., Lyndhurst, Ohio

[21] Appl. No.: 230,252

[22] Filed: Aug. 9, 1988

[51] Int. Cl.$^4$ .................. F16F 13/00; F16F 15/03; F16M 13/00

[52] U.S. Cl. .................. 267/140.1; 188/267; 248/566

[58] Field of Search .............. 267/136, 35, 121, 122, 267/140.1, 141.2, 217, 219, 220, 256, 258, 293, 294, 64.26; 188/267, 269, 322.5; 248/550, 562, 566, 636, 638

[56] References Cited

U.S. PATENT DOCUMENTS

| | | | |
|---|---|---|---|
| 3,059,915 | 10/1962 | Kemelhor | 188/267 X |
| 3,658,314 | 4/1972 | Luzsicza | 267/35 X |
| 4,720,087 | 1/1988 | Duclos et al. | 267/219 X |
| 4,733,758 | 3/1988 | Duclos et al. | 188/267 |

FOREIGN PATENT DOCUMENTS

3210731 10/1983 Fed. Rep. of Germany ...... 188/269
2111171 6/1983 United Kingdom .

Primary Examiner—Robert J. Oberleitner
Attorney, Agent, or Firm—Tarolli, Sundheim & Covell

[57] ABSTRACT

A spring for resisting relative movement of parts and for urging the parts to an initial, equilibrium position when the parts are moved therefrom includes a cylindrical hub concentric within an outer cylinder. The hub is fixedly connectable to one part and the outer cylinder is fixedly connectable to another part. An inner cylinder is concentric between the hub and the outer cylinder. A plurality of elastomeric spring members is connected between the hub and the inner cylinders and between the inner and outer cylinders to define two annular sealed fluid chambers. A fluid is disposed within each chamber. A variable energy field is applied across the fluid in one chamber to control its resistance to flow. Another variable energy field is applied across the fluid in the other chamber to control its resistance to flow. Each energy field is adjustable independent of the other. Upon relative movement between the hub and the outer cylinder, the spring members either axially deform, stretch, or twist, depending upon the direction of relative movement. The shape of each chamber changes and the strength of the field in each chamber changes. While the strength of each field is changing, the resistance to relative movement of the parts is changing. Thus, the spring characteristics of the spring are changing while relative movement of the parts is occurring.

21 Claims, 5 Drawing Sheets

ELECTRICALLY CONTROLLED VISCOUS ELASTIC SPRING

BACKGROUND OF THE INVENTION

1. Technical Field

The present invention relates to a spring, and more particularly relates to a spring which uses a fluid, such as electrorheological fluid or magnetic fluid, to provide a variable spring rate and a variable load-carrying capacity.

2. Background Art

Devices using electrorheological fluid or magnetic fluid to control an operating characteristic of the device are known. The resistance to flow of the fluid in such a device varies as a function of the magnitude of either an electric field or a magnetic field applied to the fluid. One device using electrorheological fluid to provide control of an operating characteristic of the device is disclosed in U.S. Pat. No. 4,790,522, issued on Dec. 13, 1988 and assigned to the assignee of the present invention. U.S. Pat. No. 4,790,522 discloses a shock absorber and a fluid spring used in a vehicle suspension system. A control valve controls flow of a hydraulic fluid between two fluid chamber portions of the shock absorber to vary the operating characteristics of the shock absorber and the fluid spring. An electrorheological fluid resists movement of the control valve to the open position. The control valve moves to an open position when the fluid pressure in one of the fluid chamber portions acts on the control valve to overcome the resistance of the electrorheological fluid.

Another known device using electrorheological fluid to provide control of an operating characteristic of the device is disclosed in British Patent Application No. 2,111,171. The device disclosed in British Patent Application No. 2,111,171 is a shock absorber having fluid chamber portions filled with electrorheological fluid. The fluid chamber portions are connected in fluid communication with each other through fluid passages. The amount of fluid flow through each fluid passage varies as a function of the magnitude of an electric field applied to the fluid in the fluid passage. The amount of fluid flow through the fluid passage decreases when the resistance to flow of the electrorheological fluid in the fluid passage increases. Likewise, the amount of fluid flow through the fluid passage increases when the resistance to flow of the electrorheological fluid in the fluid passage decreases. The damping characteristics of the shock absorber are varied when the amount of fluid flow through each of the fluid passages is varied.

A known damping device using magnetic fluid to control operating characteristic of the device is disclosed in U.S. Pat. No. 3,059,915. The device of U.S. Pat. No. 3,059,915 controls flow of a magnetic fluid through a fluid passage. The amount of fluid flow through the fluid passage varies as a function of the magnitude of a magnetic field applied to the fluid in the fluid passage. The damping characteristics of the device depend upon the amount of fluid flow through the fluid passage.

SUMMARY OF THE INVENTION

The present invention is directed to a spring which uses a fluid, such as electrorheological fluid or magnetic fluid, to provide control of spring characteristics such as spring rate and load-carrying capacity. The spring is connectable between relatively movable parts to resist movement between the parts and to urge the parts to an initial, equilibrium position when the parts are moved therefrom. The spring includes at least one sealed fluid chamber filled with electrorheological fluid or magnetic fluid. An electrorheological fluid is a two-phase material in which its resistance to flow varies as a function of an electric field applied to the fluid. A magnetic fluid is a two-phase material in which its resistance to flow varies as a function of a magnetic field applied to the fluid. By controlling the resistance to flow of the fluid in the sealed fluid chamber, spring characteristics can be varied.

In accordance with one feature of the present invention, the spring includes a plurality of sealed fluid chambers with electrorheological fluid or magnetic fluid disposed therein. The plurality of sealed fluid chambers is at least partially defined by an associated elastomeric member. The spring further includes means for independently controlling the resistance to flow of the fluid within each of the plurality of sealed fluid chambers. The means for independently controlling the resistance to flow of the fluid includes electrode means disposed within each of the plurality of sealed fluid chambers. The electrode means within each of the plurality of sealed fluid chambers provides an energy field which acts on the fluid when the electrode means is connected to an electrical energy source. The resistance to flow of the fluid varies as a function of the magnitude of the energy field acting on the fluid. When the resistance to flow of the fluid varies, the spring characteristics vary.

In accordance with another feature of the present invention, a sealed fluid chamber containing electrorheological fluid or magnetic fluid is defined by a yieldable wall which enables the chamber to change in shape as the parts between which the spring acts move relatively. The fluid flows to change shape as the chamber changes shape and thereby resists relative movement of the parts. By varying the resistance to flow of the fluid, the ability of the fluid to flow changes and thus the ability of the chamber shape to change varies. Thus, the spring characteristics change.

In a preferred embodiment of the present invention, the spring includes a hub connectable to one part and an outer cylinder connectable to another part. The hub is coaxial with and concentric with the outer cylinder. The spring further includes an inner cylinder coaxial with and concentric with the hub and the outer cylinder. The spring further includes two sets of elastomeric spring members. One set of elastomeric spring members is connected between the hub and the inner cylinder to define a first annular sealed fluid chamber therebetween. Another set of elastomeric spring members is connected between the inner cylinder and the outer cylinder to define a second annular sealed fluid chamber therebetween. Electrorheological fluid is disposed in the first fluid chamber.

A first electrode connectable to one potential of an electrical energy source is disposed on the outer periphery of the hub and is exposed to the first fluid chamber. A second electrode connectable to another terminal of the electrical energy source is disposed on the inner periphery of the inner cylinder and is also exposed to the first fluid chamber. The second electrode is coaxial with the first electrode and has a surface area in facing relationship with a surface area of the first electrode. Similarly, electrorheological fluid is disposed in the second fluid chamber. A third electrode connectable to the other terminal of the electrical energy source is disposed on the outer periphery of the inner cylinder and is exposed to the second fluid chamber A fourth electrode connectable to the one potential of the electrical energy source is disposed on the inner periphery of the outer cylinder and is also exposed to the second fluid chamber.

When the first and second electrodes are connected to the electrical energy source, an electric field is applied to the fluid in the vicinity of the first and second electrodes in the first fluid chamber. The resistance to flow of the fluid in the first fluid chamber varies as a function of the magnitude of the electric field applied to the fluid. Similarly, when the third and fourth electrodes are connected to the electrical energy source, an electric field is applied to the fluid in the vicinity of the third and fourth electrodes in the second fluid chamber. The resistance to flow of the fluid in the second fluid chamber varies as a function of the magnitude of the electric field applied to the fluid. Although only one electrical energy source is required, it is possible to use two electrical energy sources. If two electrical energy sources are used, then one electrical energy source may provide the electric field in one fluid chamber while the other electrical energy source may provide the electric field in the other fluid chamber.

When the resistance to flow of the fluid in either fluid chamber is varied, the characteristics of the spring are varied. When the resistance to flow of the fluid in either fluid chamber increases, the spring rate increases. When the resistance to flow of the fluid in either fluid chamber decreases, the spring rate decreases. Thus, the spring characteristics of the spring are varied and controlled in response to the magnitude of the electric field applied to the fluid in the first fluid chamber and the magnitude of the electric field applied to the fluid in the second fluid chamber.

The spring acts between the parts to resist axial, lateral, angular, and torsional relative movement of the parts from an equilibrium condition. The spring is normally in an initial, unbiased condition. When relative movement of the parts occurs, the spring moves from its initial, unbiased condition. Each elastomeric spring member is either deformed axially, stretched, or twisted, depending upon the direction of relative movement. This causes the shape of the first fluid chamber and the shape of the second fluid chamber to change. The fluid in the first fluid chamber resists the change in shape of the first fluid chamber. Similarly, the fluid in the second fluid chamber resists the change in shape of the second fluid chamber.

When relative movement of the parts between which the spring acts occurs, the first electrode and the second electrode move with respect to each other. When this occurs, the area in facing relationship between the first and second electrodes may change depending upon the direction of relative movement. Also, the distance between the first and second electrodes may change. If the area in facing relationship or the distance between the first and second electrodes changes, then the strength of the electric field applied by the electrodes to the fluid in the first fluid chamber changes.

At the same time the first and second electrodes are moving relative to each other, the third electrode and fourth electrode are moving relative to each other. When the third and fourth electrodes move relative to each other, the area in facing relationship between the third and fourth electrodes may change depending upon the direction of relative movement. Also, the distance between the third and fourth electrodes may change. If the area in facing relationship or the distance between the third and fourth electrodes changes, then the strength of the electric field applied to the fluid in the second fluid chamber changes. While the strength of each electric field is changing, the amount of resistance to the relative movement of the parts is changing.

The resiliency of the two sets of elastomeric spring members urges the spring back to the equilibrium condition. As the spring is being urged back to the equilibrium condition, the strength of each electric field is changing. Again, the amount of resistance to the relative movement of the parts is changing. Thus, the spring characteristics of the spring changes during the relative movement of the parts and also during the return of the spring back to its equilibrium condition.

BRIEF DESCRIPTION OF THE DRAWINGS

The foregoing and other features and advantages of the present invention will become apparent to those skilled in the art to which the present invention relates from reading the following description of preferred embodiments in conjunction with the accompanying drawings, wherein.

DESCRIPTION OF PREFERRED EMBODIMENTS

Figure 1:
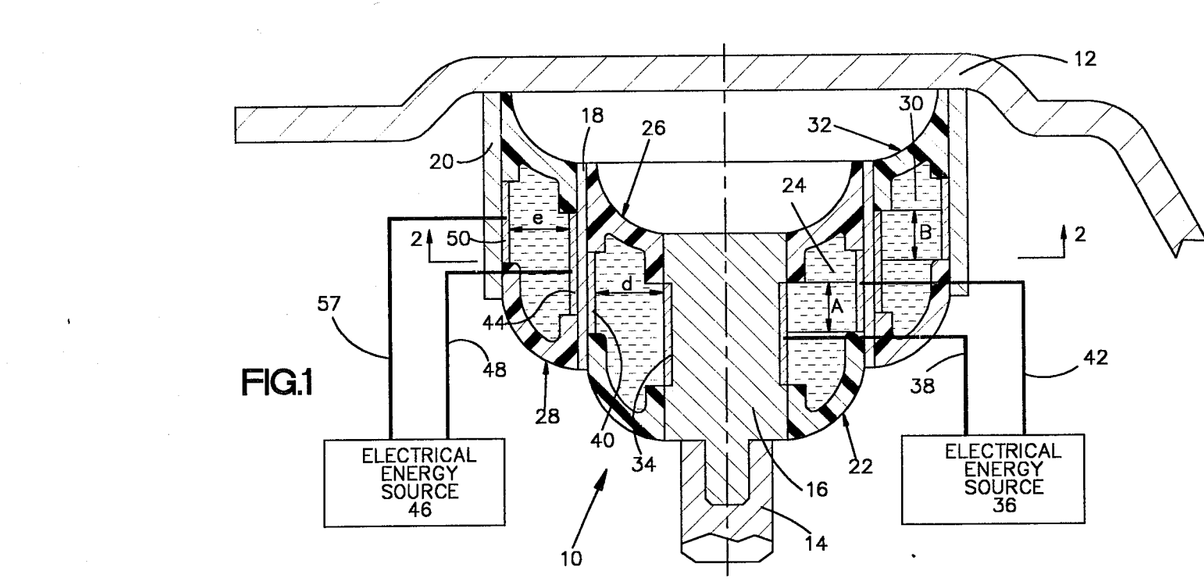
FIG. 1 is a schematic illustration of a spring constructed in accordance with the present invention in an initial, equilibrium condition.

The present invention relates to a spring connectable between movable parts for yieldably resisting relative movement of the parts. The specific construction and use of the spring may vary. As illustrated in FIG. 1, a spring 10 is in an initial, unbiased, equilibrium condition. The spring 10 is connected between a part 12 and another part 14.

Figure 2:
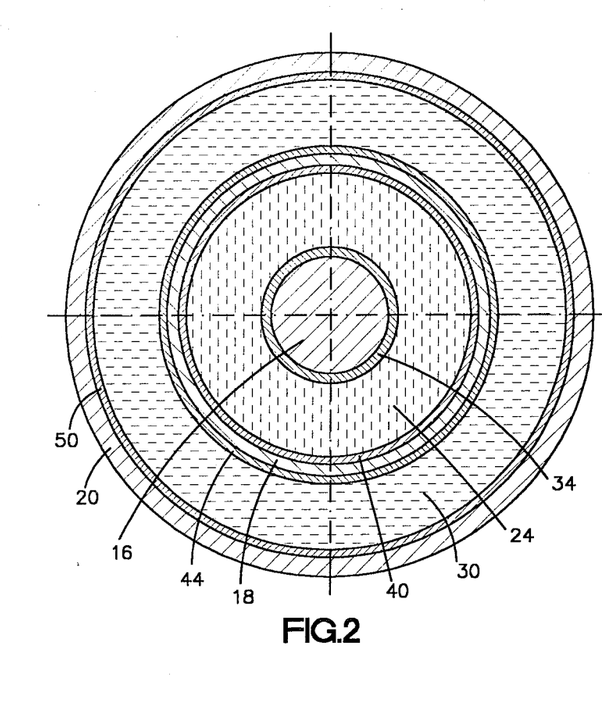
FIG. 2 is a cross-sectional view taken approximately along the line 2—2 of FIG. 1.

Referring to FIGS. 1 and 2, the spring 10 includes a cylindrical hub 16 having one end fixedly connected to the part 14. The hub 16 is coaxial with and extends into an inner cylinder 18. A first annular shaped elastomeric spring 22 is connected between the outer periphery of the hub 16 and the inner periphery of the inner cylinder 18 to form a portion of an annular shaped fluid chamber 24. A second annular shaped elastomeric spring 26 is connected between the outer periphery of the hub 16 and the inner periphery of the inner cylinder 18 to form another portion of the fluid chamber 24.

An outer cylinder 20 coaxial with and concentric around the inner cylinder 18 is fixedly connected to the part 12. A third annular shaped elastomeric spring 28 is connected between the outer periphery of the inner cylinder 18 and the inner periphery of the outer cylinder 20 to form a portion of a second annular shaped fluid chamber 30. A fourth annular shaped elastomeric spring 32 is connected between the outer periphery of the inner cylinder 18 and the inner periphery of the outer cylinder 20 to form another portion of the fluid chamber 30.

A first annular shaped electrode 34 is disposed on the outer periphery of the hub 16 and is exposed to the fluid chamber 24. The first electrode 34 is electrically insulated from the hub 16. The first electrode 34 is electrically connectable to the negative terminal of an electrical energy source 36 through an electrical connection 38. A second annular shaped electrode 40 is disposed on the inner periphery of the inner cylinder 18 and is exposed to the fluid chamber 24. The second electrode 40 is electrically insulated from the inner cylinder 18. The second electrode 40 is electrically connectable to the positive terminal of the electrical energy source 36 through an electrical connection 42.

A third annular shaped electrode 44 is disposed on the outer periphery of the inner cylinder 18 and is exposed to the fluid chamber 30. The third electrode 44 is electrically insulated from the inner cylinder 18. The third electrode 44 is electrically connectable to the positive terminal of an electrical energy source 46 through an electrical connection 48. A fourth annular shaped electrode 50 is disposed on the inner periphery of the outer cylinder 20 and is exposed to the fluid chamber 30. The fourth electrode 50 is electrically insulated from the outer cylinder 20. The fourth electrode 50 is electrically connectable to the negative terminal of the electrical energy source 46 through an electrical connection 57.

When the first and second electrodes 34, 40 are electrically connected to the electrical energy source 36, a voltage potential is established between the first electrode 34 and the second electrode 40. An electric field is thereby created between the first and second electrodes 34, 40. A fluid which responds to an energy field, such as an electrorheological fluid or magnetic fluid, is disposed in the fluid chamber 24. An electrorheological fluid is a two-phase material in which its resistance to flow varies as a function of an electric field acting on the fluid. A magnetic fluid is a two-phase material in which its resistance to flow varies as a function of a magnetic field acting on the fluid. For purposes of simplicity, only electrorheological fluid will be referred to hereinbelow.

The electric field acts on the electrorheological fluid and has a strength proportional to the voltage potential between the first and second electrodes 34, 40. The resistance to flow of the electrorheological fluid is proportional to the strength of the electric field applied across the fluid in the fluid chamber 24. Thus, when the voltage from the electrical energy source 36 is varied, the resistance to flow of the electrorheological fluid is varied.

Similarly, when the third and fourth electrodes 44, 50 are electrically connected to the electrical energy source 46, a voltage potential is established between the third electrode 44 and the fourth electrode 50. An electric field is thereby created between the third and fourth electrodes 44, 50. An electrorheological fluid is disposed in the fluid chamber 30. The electric field acts on the electrorheological fluid and has a strength proportional to the voltage potential between the third and fourth electrodes 44, 50. The resistance to flow of the electrorheological fluid is proportional to the strength of the electric field applied across the fluid in the fluid chamber 30. Thus, when the voltage from the electrical energy source 46 is varied, the resistance to flow of the electrorheological fluid in the fluid chamber 30 is varied.

When the resistance to flow of the electrorheological fluid in either fluid chamber 24, 30 is varied, the spring characteristics of the spring 10 are varied. As the resistance to flow of the fluid in either fluid chamber 24, 30 decreases, the spring rate of the spring 10 decreases. Likewise, as the resistance to flow of the fluid in either fluid chamber 24, 30 increases, the spring rate of the spring 10 increases. Thus, the spring characteristics of the spring 10 are varied and controlled in response to the electric field applied to the fluid in the fluid chamber 24 and the electric field applied to the fluid in the fluid chamber 30.

One way to vary the strength of the electric field applied to the fluid in the fluid chamber 24 is to vary the voltage potential between the first electrode 34 and the second electrode 40. Another way to vary the strength of the electric field applied to the fluid in the fluid chamber 24 is to change the distance between the first electrode 34 and the second electrode 40. Also, the size of the electric field can change by varying the area of the first electrode 34 and the second electrode 40 which is in facing relationship. The distance between the first and second electrodes 34, 40 or the area of the first and second electrodes 34, 40 in facing relationship changes when the hub 16 moves relative to the inner cylinder 18.

When the distance between the first and second electrodes 34, 40 increases, the strength of the electric field applied across the electrorheological fluid in the fluid chamber 24 decreases. Likewise, when the distance between the first electrode 34 and the second electrode 40 decreases, the strength of the electric field applied across the electrorheological fluid in the fluid chamber 24 increases. Thus, the resistance to flow of the electrorheological fluid in the fluid chamber 24 decreases when the distance between the first and second electrodes 34, 40 increases, and increases when the distance decreases.

When the area in facing relationship between the first and second electrodes 34, 40 increases, the size of the electric field applied across the electrorheological fluid in the fluid chamber 24 increases. Likewise, when the area in facing relationship between the first and second electrodes 34, 40 decreases, the size of the electric field applied across the fluid in the fluid chamber 24 decreases. Thus, the resistance to flow of the electrorheological fluid in the fluid chamber 24 increases when the area in facing relationship between the first electrode 34 and the second electrode 40 increases, and decreases when the area decreases.

Similarly, one way to vary the strength of the electric field applied to the fluid in the fluid chamber 30 is to vary the voltage potential between the third electrode 44 and the fourth electrode 50. Another way to vary the strength of the applied electric field in the fluid chamber 30 is to change the distance between the third electrode 44 and the fourth electrode 50. Also, the size of the electric field can change by varying the area of the third electrode 44 and second electrode 50 which is in facing relationship. The distance between the third and fourth electrodes 44, 50 or the area of the third and fourth electrodes 44, 50 in facing relationship changes when the outer cylinder 20 moves relative to the inner cylinder 18.

When the distance between the third and fourth electrodes 44, 50 increases, the strength of the electric field applied across the electrorheological fluid in the fluid chamber 30 decreases. Likewise, when the distance between the third and fourth electrodes 44, 50 decreases, the strength of the electric field applied across the electrorheological fluid in the fluid chamber 30 increases. Thus, the resistance to flow of the electrorheological fluid in the fluid chamber 30 decreases when the distance between the third electrode 44 and the fourth electrode 50 increases, and increases when the distance decreases.

When the area in facing relationship between the third and fourth electrodes 44, 50 increases, the size of the electric field applied across the fluid in the fluid chamber 30 increases. Likewise, when the area in facing relationship between the third and fourth electrodes 44, 50 decreases, the size of the electric field applied across the fluid in the fluid chamber 30 decreases. Thus, the resistance to flow of the electrorheological fluid in the fluid chamber 30 increases when the area in facing relationship between the third electrode 44 and the fourth electrode 50 increases, and decreases when the area decreases.

As shown in FIG. 1, the spring 10 is connected between the part 12 and the part 14 and are in normal or desired relative positions. The hub 16, which is fixed to part 14, and the outer cylinder 20, which is fixed to part 12, are relatively movable in compression or expansion strokes to yieldably resist relative movement of the part 12 and the part 14. The hub 16 and the outer cylinder 20 move relatively in a compression stroke when the parts 12, 14 move toward each other. The hub 16 and the outer cylinder 20 move relatively in an extension stroke when the parts 12, 14 move away from each other. The four elastomeric springs 22, 26, 28, 32 yieldingly resist relative movement of the hub 16 and the outer cylinder 20.

The resilient characteristics of the elastomeric springs 22, 26, 28, 32 and the electric fields established in the fluid chambers 24, 30 at any given moment define the spring characteristics of the spring 10. The electric field established in each of the fluid chambers 24, 30 is independently adjustable. This enables the spring rate and the load-carrying capacity of the spring 10 to be adjusted through a relatively large range.

Figure 3:
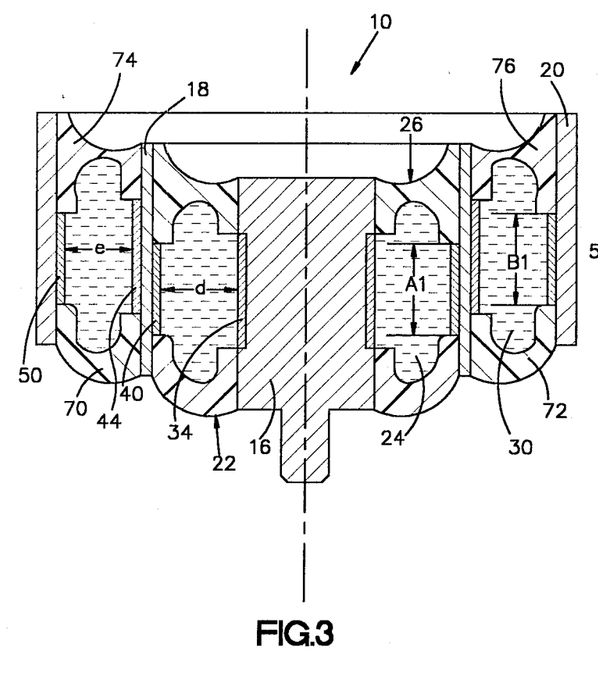
FIG. 3 is a longitudinal, cross-sectional view, illustrating the spring of FIG. 1 in an axially compressed condition.

During a compression stroke of the spring 10 from the equilibrium condition shown in FIG. 1 to the condition shown in FIG. 3, the hub 16 telescopes axially into the outer cylinder 20. A variety of actions occur concurrently during the compression stroke. The parts 12, 14 (not shown in FIG. 3) move toward each other Since the outer cylinder 20 is fixedly connected to the part 12, the part 14 connected with the hub 16 moves toward the part 12. The hub 16 telescopes axially into the outer cylinder 20. The two elastomeric springs 22, 26 between the hub 16 and the inner cylinder 18 are deformed axially between the hub 16 and the inner cylinder 18. Similarly, the two elastomeric springs 28, 32 are deformed axially between the inner cylinder 18 and the outer cylinder 20.

As the elastomeric springs 22, 26 are being axially deformed between the hub 16 and the inner cylinder 18, the shape of the fluid chamber 24 changes. The volume of the fluid in the fluid chamber 24 remains constant during the compression stroke. While the shape of the fluid chamber 24 is changing, the distance between the first and second electrodes 34, 40 does not change. As shown in FIGS. 1 and 3, this distance is designated as "d". At the same time, the area in facing relationship between the first and second electrodes 34, 40 within the fluid chamber 24 increases. In the initial condition of the spring 10, as shown in FIG. 1, the area in facing relationship between the first and second electrodes 34, 40 is designated as "A". After the spring 10 is compressed, the area in facing relationship between the first and second electrodes 34, 40 increases to an area designated as "A1" shown in FIG. 3.

When the area in facing relationship between the first and second electrodes 34, 40 increases, the size of the electric field applied across the fluid in the fluid chamber 24 increases. The resistance to flow of the fluid in the fluid chamber 24 increases when the applied electric field increases. When the resistance to flow of the fluid in the fluid chamber 24 increases, the resistance to relative movement of the part 12 and the part 14 increases. Thus, as the shape of the fluid chamber 24 changes during the compression stroke, the resistance to relative movement of the part 12 and the part 14 increases.

Also, as the elastomeric springs 28, 32 are being axially deformed between the inner cylinder 18 and the outer cylinder 20, the shape of the fluid chamber 30 changes. The volume of the fluid in the fluid chamber 30 remains constant during the compression stroke. While the shape of the fluid chamber 30 is changing, the distance between the third and fourth electrodes 44, 50 does not change. As shown in FIGS. 1 and 3, this distance is designated as "e". At the same time, the area in facing relationship between the third and fourth electrodes 44, 50 within the fluid chamber 30 increases. In the initial condition of the spring 10, as shown in FIG. 1, the area in facing relationship between the third and fourth electrodes 44, 50 is designated as "B". After the spring 10 is compressed, the area in facing relationship between the third and fourth electrodes 44, 50 increases to an area designated as "B1" shown in FIG. 3.

When the area in facing relationship between the third and fourth electrodes 44, 50 increases, the size of the electric field applied across the fluid in the fluid chamber 30 increases. The resistance to flow of the fluid in the fluid chamber 30 increases when the applied electric field increases. When the resistance to flow of the fluid in the fluid chamber 30 increases, the resistance to relative movement of the part 12 and the part 14 increases. Thus, the resistance to relative movement of the part 12 and the part 14 increases as the spring 10 compresses.

During a rebound stroke of the spring 10, the resiliency of the elastomeric springs 22, 26, 28, 32 urges the spring 10 from the condition shown in FIG. 3 to the initial, equilibrium condition shown in FIG. 1. The hub 16 telescopes axially away from the outer cylinder 20. As the spring 10 extends from the compressed condition in FIG. 3, the shape of the fluid chamber 24 changes. The volume of the fluid in the fluid chamber 24 remains the same. The distance "d" between the first and second electrodes 34, 40 remains the same. At the same time, the area in facing relationship between the first and second electrodes 34, 40 decreases.

The size of the electric field applied across the fluid in the fluid chamber 24 decreases as the area in facing relationship between the first and second electrodes 34, 40 decreases. The resistance to flow of the electrorheological fluid in the fluid chamber 24 thereby decreases. When the resistance to flow of the fluid in the fluid chamber 24 decreases, the resistance to relative movement of the part 12 and the part 14 decreases. Thus, the resistance to relative movement of the part 12 and the part 14 decreases as the spring 10 rebounds from the compressed condition shown in FIG. 3. The resistance continues to decrease until the spring 10 reaches the initial condition shown in FIG. 1 in which the area in facing relationship between the first and second electrodes 34, 40 is again "A".

Also, as the spring 10 extends from the compressed condition in FIG. 3, the shape of the fluid chamber 30 changes. The volume of the fluid in the fluid chamber 30 remains the same. The distance "e" between the third and fourth electrodes 44, 50 remains the same. At the same time, the area in facing relationship between the third and fourth electrodes 44, 50 decreases.

The size of the electric field applied across the fluid in the fluid chamber 30 decreases as the area in facing relationship between the third and fourth electrodes 44, 50 decreases. The resistance to flow of the electrorheological fluid in the fluid chamber 30 thereby decreases. When the resistance to flow of the fluid in the fluid chamber 30 decreases, the resistance to relative movement of the part 12 and the part 14 decreases. Thus, the resistance to relative movement between the part 12 and the part 14 decreases as the spring 10 rebounds from the compressed condition shown in FIG. 3. The resistance continues to decrease until the spring 10 reaches the initial condition shown in FIG. 1 in which the area in facing relationship between the third and fourth electrodes 44, 50 is again "B".

Figure 4:
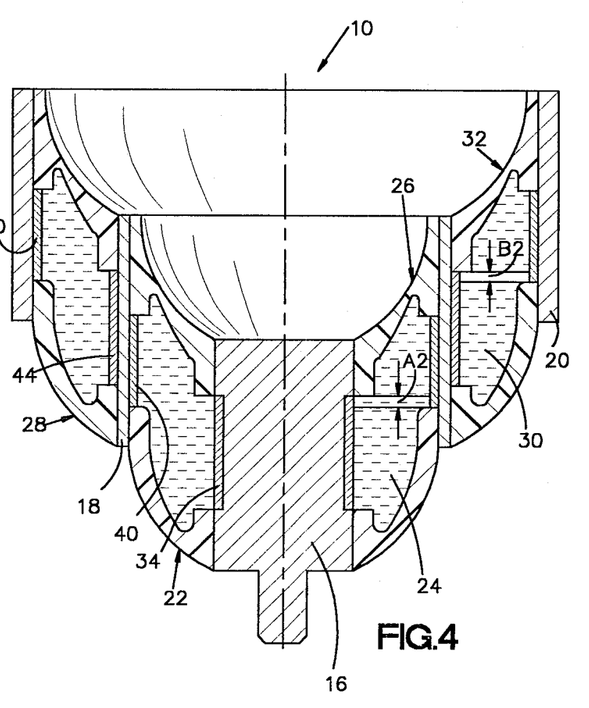
FIG. 4 is a longitudinal, cross-sectional view, illustrating the spring of FIG. 1 in an axially extended condition.

During an extension stroke from the condition shown in FIG. 1 to the condition shown in FIG. 4, the hub 16 telescopes axially away from the outer cylinder 20. Again, a variety of actions occurs concurrently during the extension stroke. The parts 12, 14 (not shown in FIG. 4) move away from each other. Since the outer cylinder 20 is fixedly connected to the part 12, the part 14 connected with the hub 16 moves away from the part 12. The hub 16 telescopes axially away from the outer cylinder 20. The elastomeric springs 22, 26 are stretched between the hub 16 and the inner cylinder 18. Similarly, the elastomeric springs 28, 32 are stretched between the inner cylinder 18 and the outer cylinder 20.

As the springs 22, 26 are being stretched between the hub 16 and the inner cylinder 18, the shape of the fluid chamber 24 changes. The volume of the fluid in the fluid chamber 24 remains constant during the extension stroke. The distance "d" between the first and second electrodes 34, 40 does not change. At the same time, the area in facing relationship between the first and second electrodes 34, 40 decreases. This area is reduced from the area "A" as shown in FIG. 1 to an area designated as "A2" shown in FIG. 4.

When the area in facing relationship between the first and second electrodes 34, 40 decreases, the size of the electric field applied across the fluid in the fluid chamber 24 decreases. The resistance to flow of the fluid in the fluid chamber 24 thereby decreases during the extension stroke. When the resistance to flow of the fluid in the fluid chamber 24 decreases, the resistance to relative movement of the part 12 and the part 14 decreases. Thus, as the shape of the fluid chamber 24 changes during the extension stroke, the resistance to relative movement of the part 12 and the part 14 decreases.

Also, as the elastomeric springs 28, 32 are being stretched between the inner cylinder 18 and the outer cylinder 20, the shape of the fluid chamber 30 changes. The volume of the fluid in the fluid chamber 30 remains constant during the extension stroke. At the same time, the area in facing relationship between the third electrode 44 and the fourth electrode 50 decreases. This area is reduced from the area "B" as shown in FIG. 1 to an area designated as "B2" shown in FIG. 4.

When the area in facing relationship between the third and fourth electrodes 44, 50 decreases, the size of the electric field applied across the fluid in the fluid chamber 30 decreases. The resistance to flow of the fluid in the fluid chamber 30 thereby decreases during the extension stroke. When the resistance to flow of the fluid in the fluid chamber 30 decreases, the resistance to relative movement of the part 12 and the part 14 decreases. Thus, as the shape of the fluid chamber 30 changes during the extension stroke, the resistance to relative movement of the part 12 and the part 14 decreases. Thus, the resistance to relative movement of the part 12 and the part 14 decreases as the spring 10 extends. After the spring 10 extends to the condition shown in FIG. 4, the resiliency of the four elastomeric springs 22, 26, 28, 32 urges the spring 10 back to the initial condition of FIG. 1.

Figure 5:
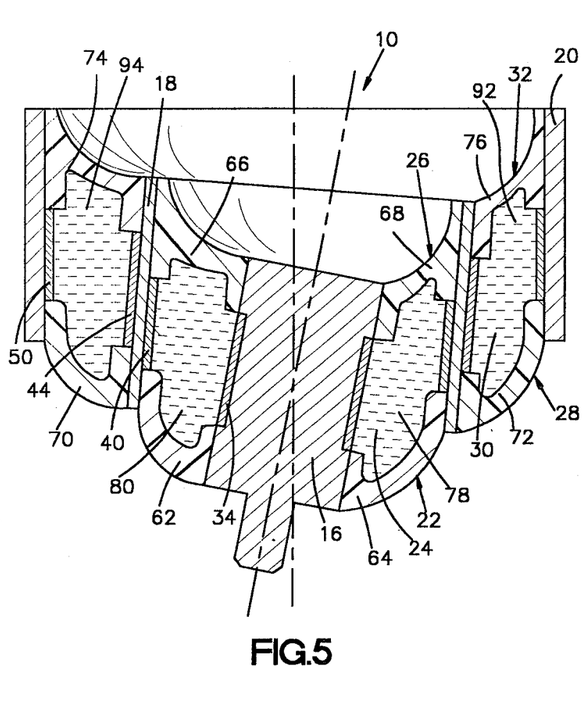
FIG. 5 is a longitudinal, cross-sectional view, illustrating the spring of FIG. 1 in an angularly compressed condition.

Although the spring 10 of the present invention is described above as compressing and extending, the spring 10 can resist other movements. Referring to FIG. 5, the spring 10 is shown in an angularly deformed or cocked condition. When the spring 10 is in the angularly deformed or cocked condition shown in FIG. 5, one side 62 of the elastomeric spring 22 is compressed and the other side 64 of the elastomeric spring 22 is stretched. One side 66 of the elastomeric spring 26 is stretched and the other side 68 of the elastomeric spring 26 is compressed. One side 70 of the elastomeric spring 28 is compressed and the other side 72 of the elastomeric spring 28 is stretched. Similarly, one side 74 of the elastomeric spring 32 is stretched and the other side 76 of the elastomeric spring 32 is compressed.

Also, when the spring 10 is angularly deformed, the shape of the fluid chamber 24 changes. The shape of the fluid chamber 24 changes to a shape such as shown in FIG. 5. The position of the first electrode 34 relative to the second electrode 40 changes. The size of the electric field in different portions of the fluid chamber 24 either increases or decreases, depending upon the position of the first electrode 34 relative to the second electrode 40 in the particular portion of the fluid chamber 24. The result is either an increase or decrease in the resistance to flow of the fluid in the particular portion of the fluid chamber 24.

Also, when the spring 10 is angularly deformed, the shape of the fluid chamber 30 changes. The shape of the fluid chamber 30 changes to a shape such as shown in FIG. 5. The position of the fourth electrode 50 relative to the third electrode 44 changes. The size of the electric field in different portions of the fluid chamber 30 either increases or decreases, depending upon the position of the third electrode 44 relative to the fourth electrode 50 in the particular portion of the fluid chamber 30. The result is either an increase or decrease in the resistance to flow of the fluid in the particular portion of the fluid chamber 30.

Thus, the spring 10 acts to resist the relative movement of the parts 12, 14 (not shown in FIG. 5) connected to the spring 10. The resistance to flow of the electrorheological fluid, and hence the resistance to relative movement of the parts 12, 14, varies in response to the amount of movement between the parts 12, 14. After the spring 10 is angularly deformed or cocked to the condition shown in FIG. 5, the resiliency of the four elastomeric springs 22, 26, 28, 32 urges the spring 10 back to the initial equilibrium condition shown in FIG. 1.

Figure 6:
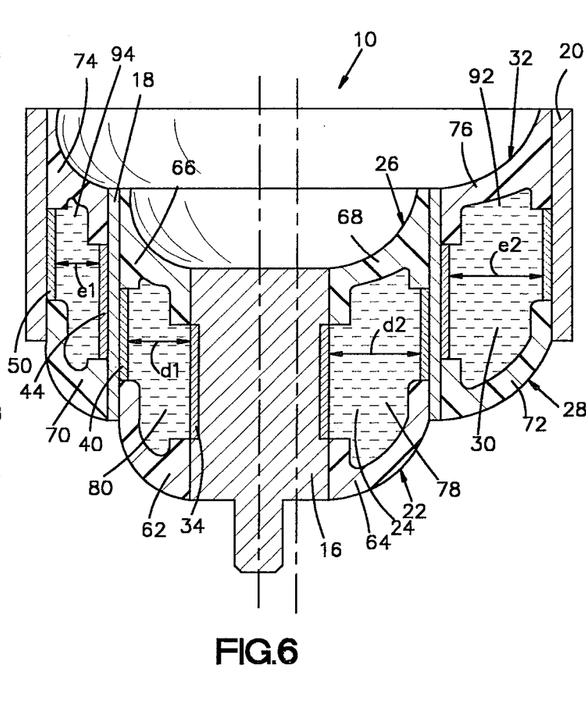
FIG. 6 is a longitudinal cross-sectional view, illustrating the spring of FIG. 1 in a laterally compressed condition.

In FIG. 6 the spring 10 is shown laterally compressed. When the two parts 12, 14 (not shown in FIG. 6) move laterally relative to each other, the spring 10 laterally compresses. The one portion 62 of the elastomeric spring 22 compresses while the other side 64 of the elastomeric spring 22 stretches. The one side 66 of the elastomeric spring 26 compresses while the other side 68 of the elastomeric spring 26 stretches. Similarly, the one side 70 of the elastomeric spring 28 compresses while the other side 72 of the elastomeric spring 28 stretches. The one side 74 of the elastomeric spring 32 compresses while the other side 76 of the elastomeric spring 32 stretches.

When the spring 10 is laterally compressed, the shape of the fluid chamber 24 changes. In one portion 80 of the fluid chamber 24, the first electrode 34 moves toward the second electrode 40. The area in facing relationship between the first and second electrodes 34, 40 in the portion 80 of the fluid chamber 24 does not change. The distance between the first and second electrodes 34, 40 in the portion 80 of the fluid chamber 24 decreases. The distance "d" shown in FIG. 1 decreases to a distance "d1" shown in FIG. 6. The size of the electric field in the portion 80 of the fluid chamber 24 increases since the first and second electrodes 34, 40 are closer together in the portion 80 of the fluid chamber 24. The resistance to flow of the fluid in the portion 80 of the fluid chamber 24 thereby increases.

In another portion 78 of the fluid chamber 24, the first electrode 34 moves away from the second electrode 40. The area in facing relationship between the first and second electrodes 34, 40 in the portion 78 of the fluid chamber 24 does not change. The distance between the first and second electrodes in the portion 78 of the fluid chamber 24 increases. The distance "d" shown in FIG. 1 increases to a distance "d2" shown in FIG. 6. The size of the electric field in the portion 78 of the fluid chamber 24 decreases since the first and second electrodes 34, 40 are farther apart in the portion 78 of the fluid chamber 24. The resistance to flow of the fluid in the portion 78 of the fluid chamber 24 thereby decreases.

Also, when the spring 10 is laterally compressed, the shape of the fluid chamber 30 changes. In one portion 94 of the fluid chamber 30, the fourth electrode 50 moves toward the third electrode 44. The area in facing relationship between the third and fourth electrodes 44, 50 in the portion 94 of the fluid chamber 30 does not change. The distance between the third and fourth electrodes 44, 50 in the portion 94 of the fluid chamber 30 decreases. The distance "e" shown in FIG. 1 decreases to a distance "e1" shown in FIG. 6. The size of the electric field in the portion 94 of the fluid chamber 30 increases since the third and fourth electrodes 44, 50 are closer together in the portion 94 of the fluid chamber 30. The resistance to flow of the fluid in the portion 94 of the fluid chamber 30 thereby increases.

In another portion 92 of the fluid chamber 30, the fourth electrode 50 moves away from the third electrode 44. The area in facing relationship between the third and fourth electrodes 44, 50 in the portion 92 of the fluid chamber 30 does not change. The distance between the third and fourth electrodes 44, 50 in the portion 92 of the fluid chamber 30 increases. The distance "e" shown in FIG. 1 increases to a distance "e2" shown in FIG. 6. The size of the electric field in the portion 92 of the fluid chamber 30 decreases since the third and fourth electrodes 44, 50 are farther apart in the portion 92 of the fluid chamber 30. The resistance to flow of the fluid in the portion 92 of the fluid chamber 30 thereby decreases.

Again, the spring 10 acts to resist the relative movement of the parts 12, 14 connected to the spring 10. The resistance to flow of the electrorheological fluid, and hence the resistance to the relative movement of the parts 12, 14 varies in response to the amount of relative movement of the parts 12, 14. After the spring 10 is laterally compressed to the condition shown in FIG. 6, the resiliency of the four elastomeric springs 22, 26, 28, 32 urges the spring 10 back to the initial, equilibrium condition shown in FIG. 1.

Figure 7:
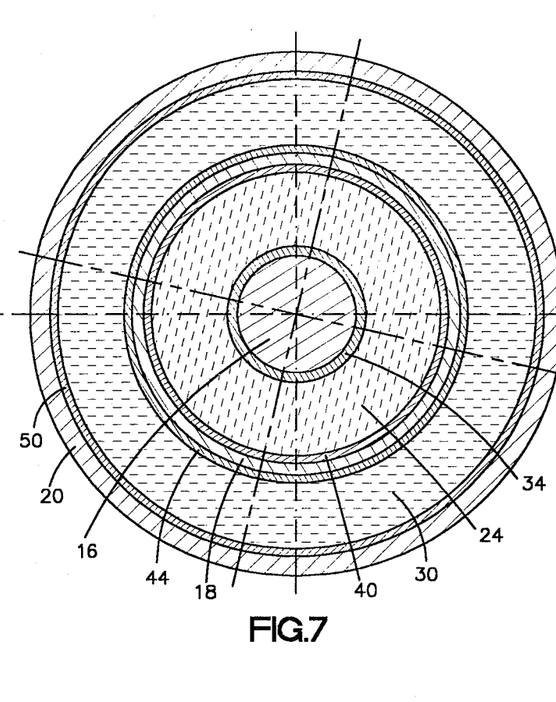
FIG. 7 is a view similar to FIG. 2 illustrating the spring of FIG. 1 in a torsionally loaded condition.

The spring 10 is illustrated in FIG. 7 torsionally loaded about the longitudinal central axis of the spring 10. In this condition, the hub 16 is rotated about its longitudinal central axis relative to the outer cylinder 20. When this relative movement occurs, the inner periphery of the elastomeric spring 22 connected to the outer periphery of the hub 16 is turned about the longitudinal central axis of the spring 10 in an opposite direction relative to the outer periphery of the elastomeric spring 22 connected to the inner periphery of the inner cylinder 18. Similarly, the inner periphery of the elastomeric spring 26 connected to the outer periphery of the hub 16 is turned about the longitudinal central axis of the spring 10 in an opposite direction relative to the outer periphery of the elastomeric spring 26 connected to the inner periphery of the inner cylinder 18. Thus, the elastomeric springs 22, 26 deform when the spring 10 is torsionally loaded. The drag effect between the fluid and the elastomeric springs 22, 26 resists the deformation of the elastomeric springs 22, 26.

Also, when the spring is torsionally loaded, the inner periphery of the elastomeric spring 28 connected to the outer periphery of the inner cylinder 18 is turned about the longitudinal central axis of the spring 10 in an opposite direction relative to the outer periphery of the elastomeric spring 28 connected to the inner periphery of the outer cylinder 20. The inner periphery of the elastomeric spring 32 connected to the outer periphery of the inner cylinder 18 is turned about the longitudinal central axis of the spring 10 in an opposite direction relative to the outer periphery of the elastomeric spring 32 connected to the inner periphery of the outer cylinder 20. The drag effect between the fluid and the elastomeric springs 28, 32 resists the deformation of the elastomeric springs 28, 32.

When the spring 10 is subjected to a torsional load resulting in the condition shown in FIG. 7, the area in facing relationship between the first and second electrodes 34, 40 does not change. The distance between the first and second electrodes 34, 40 in the fluid chamber 24 does not change. The result is that the strength of the electric field between the first and second electrodes 34, 40 in the fluid chamber 24 does not change. Also, the area in facing relationship between the third and fourth electrodes 44, 50 does not change The distance between the third and fourth electrodes 44, 50 in the fluid chamber 30 does not change. The result is that the strength of the electric field between the third and fourth electrodes 44, 50 in the fluid chamber 30 does not change. Thus, the resistance to relative torsional movement of the parts 12, 14 is provided by the resistance of the four elastomeric springs 22, 26, 28, 32, the drag effect of the fluid in the fluid chamber 24 and the drag effect of the fluid in the fluid chamber 30. After the spring 10 is torsionally loaded, the resiliency of the elastomeric springs 22, 26, 28, 32 urges the spring 10 back to the initial, equilibrium condition of FIG. 1.

Figure 8:
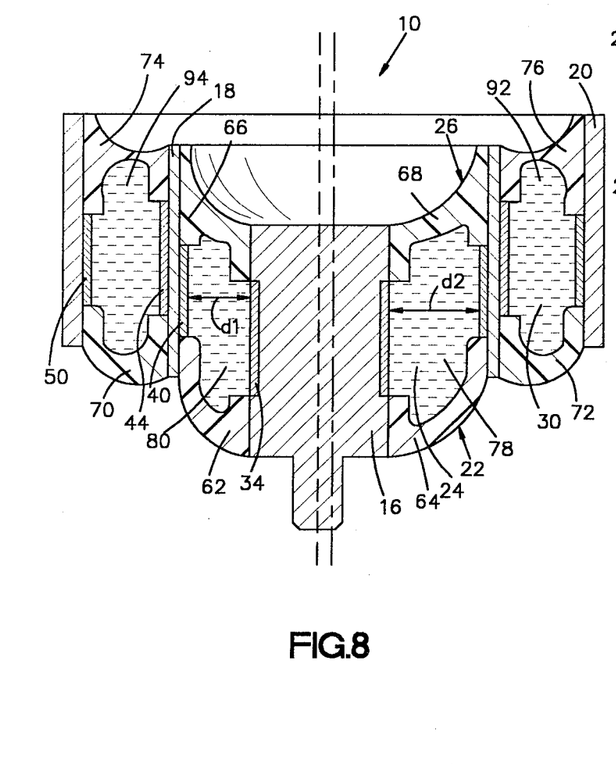
FIG. 8 is a longitudinal, cross-sectional view, illustrating the spring of FIG. 1 in a combined axially and laterally compressed condition.

It should be apparent from the above description that the spring 10 of the present invention is able to resist axial loading, angular loading, lateral loading, torsional loading, or a combination thereof. Referring to FIG. 8, the spring 10 is shown in a combined axially compressed and laterally compressed condition. In the condition of the spring 10 as illustrated in FIG. 8, the area in facing relationship between the first and second electrodes 34, 40 in the portion 78 of the fluid chamber 24 is greater than when the spring 10 is in the initial condition of FIG. 1. The distance between the first and second electrodes 34, 40 in the portion 78 of the fluid chamber 24 is greater. The area in facing relationship between the first and second electrodes 34, 40 in the portion 80 of the fluid chamber 24 is greater. The distance between the first and second electrodes 34, 40 in the portion 80 of fluid chamber 24 is less.

Similarly, the area in facing relationship between the third and fourth electrodes 44, 50 in the portion 94 of the fluid chamber 30 is greater than when the spring 10 is in the initial condition of FIG. 1. The distance between the third and fourth electrodes 44, 50 in the portion 94 of the fluid chamber 30 is less. The area in facing relationship between the third and fourth electrodes 44, 50 in the portion 92 of the fluid chamber 30 is greater. The distance between the third and fourth electrodes 44, 50 in the portion 92 of the fluid chamber 30 is greater.

The strength of the electric field in each portion of each of the fluid chambers 24, 30 varies as a function of the distance between and the area in facing relationship between the electrodes in that particular portion of each of the fluid chambers 24, 30. The resistance to flow of the fluid, and hence the resistance to relative movement of the parts 12, 14 (not shown in FIG. 8), varies as a function of the electric fields in a manner as already described hereinabove. By varying the resistance to flow of the fluid in the fluid chamber 24 and the resistance to flow of the fluid in the fluid chamber 30 in this manner, the spring 10 is dynamically adjusted and adapted to a large range of load conditions. After the spring 10 is axially and laterally compressed, the resiliency of the four elastomeric springs 22, 26, 28, 32 urges the spring 10 back to its initial, equilibrium condition shown in FIG. 1.

Figure 9:
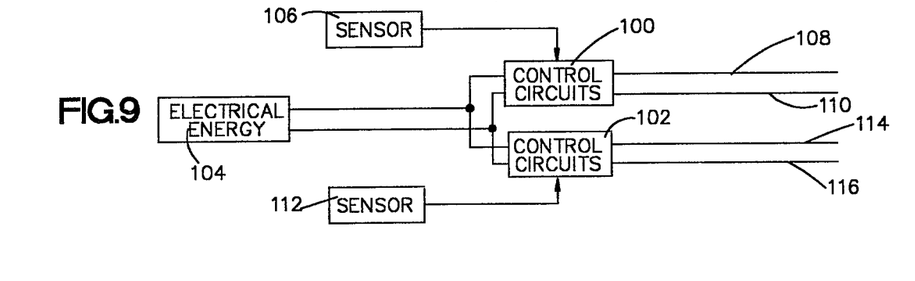
FIG. 9 is a block diagram illustrating control circuits used in conjunction with the spring of FIG. 1.

It may be desirable to further control the spring characteristics of the spring 10 by controlling the voltages applied to the electrodes 34, 40, 44, 50 in response to electrical input signals. These electrical input signals may be indicative of spring operating conditions such as height of the spring 10 or lateral position of the spring 10. An arrangement of control circuits for providing such control is illustrated in FIG. 9. Two control circuits 100, 102 are connected to a source of electrical energy 104.

The control circuit 100 monitors the electrical input signals indicative of spring operating conditions from a sensor 106. In response to these electrical input signals, the control circuit 100 controls high voltage signals on lines 108, 110. The line 108 is electrically connected to the first electrode 34 (not shown) and the line 110 is electrically connected to the second electrode 40 (not shown). The high voltage signals applied to the first and second electrodes 34, 40 vary to maintain proper or desired spring operation conditions.

Similarly, the control circuit 102 monitors electrical input signals indicative of spring operating conditions from a sensor 112. In response to these electrical input signals, the control circuit 102 controls high voltage signals on lines 114, 116. The line 114 is electrically connected to the third electrode 44 (not shown) and the line 116 is electrically connected to the fourth electrode 50 (not shown). The high voltage signals applied to the third and fourth electrodes 44, 50 vary to maintain proper or desired spring operating conditions.

Figure 10:
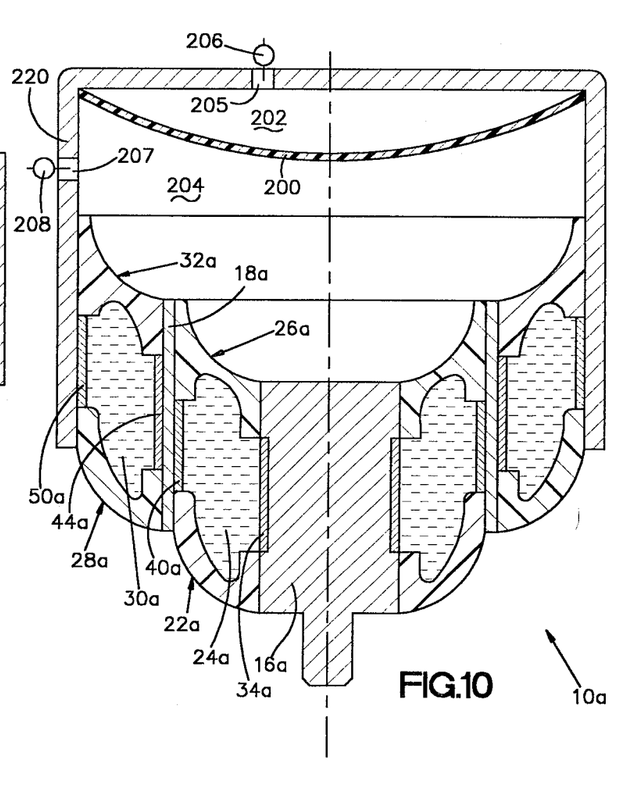
FIG. 10 illustrates a second embodiment of the present invention in which a spring has a pressure chamber at one end of the spring.

The result is a spring having characteristics which vary as a function of spring operating conditions, the relative positioning of the first and second electrodes 34, 40, the relative positioning of the third and fourth electrodes 44, 50, and the resiliency characteristics of the four elastomeric springs 22, 26, 28, 32. The resistance to flow of the fluid in any portion of the fluid chamber 24 at any given moment depends upon the voltage signals applied to the first and second electrodes 34, 40 and the relative position of the first and second electrodes 34, 40 in the particular portion of the fluid chamber 24. Similarly, the resistance to flow of the fluid in any portion of the fluid chamber 30 at any given moment depends upon the voltage signals applied to the third and fourth electrodes 44, 50 and the relative positioning of the third and fourth electrodes 44, 50 in the particular portion of the fluid chamber 30. By controlling the resistance to flow of the electrorheological fluid in each of the fluid chambers 24, 30 in this manner, a soft spring rate and maximum load-carrying capacity of the spring 10 is provided It is contemplated that it may be preferred to have a pressure chamber at one end of the spring 10. Such an embodiment of the present invention is disclosed in FIG. 10. Since the embodiment illustrated in FIG. 10 is generally similar to the embodiment illustrated in FIGS. 1-8, similar numerals are utilized to designate similar components, the suffix letter "a" being added to the numerals associated with the embodiment of FIG. 10.

The spring 10a includes a cylindrical shaped member 220 having a portion of the inner periphery of the member 220 partially define the fluid chamber 30a. The outer periphery of the elastomeric spring 28a is connected to the inner periphery of the member 220. Similarly, the outer periphery of the elastomeric spring 32a is connected to the inner periphery of the member 220. The fourth electrode 50a is disposed on the inner periphery of the member 220. The fluid chamber 30a is defined in part by the member 220.

The member 220 partially defines a chamber which is divided into two portions by an elastomeric bladder 200. One chamber portion 202 is defined by the member 220 and the bladder 200 to form a gas chamber. The chamber portion 202 is filled with a suitable gas, such as air, through a valve assembly 206 disposed in a porthole 205 of the member 220. Another chamber portion 204 is defined by the bladder 200, the member 220, the hub 16a, the elastomeric spring 26a, and the elastomeric spring 32a. The chamber portion 204 is filled with a suitable fluid through another valve assembly 208 disposed in another porthole 207 of the member 220.

During a compression stroke of the spring 10a, the hub 16a telescopes axially toward the member 220. The pressure in the chamber portion 202 and the pressure in the chamber portion 204 increase. The resiliency of the elastomeric springs 22a, 26a, 28a, 32a, the pressure within the chamber portion 202, and the pressure within the chamber portion 204 provide for gradual compression of the spring 10a.

The present invention has been described above with reference to preferred embodiments. Modifications and alterations may become apparent to one skilled in the art upon reading and understanding this specification. It is intended to include all such modifications and alterations within the scope of the appended claims.

Having described preferred embodiments of the invention, I claim:

1. A spring connectable between relatively movable parts to resist relative movement of the parts, said spring comprising:
   means defining a plurality of sealed fluid chambers filled with a fluid having a flow characteristic which varies in response to an energy field acting on the fluid, said plurality of sealed fluid chambers at least partially defined by associated elastomeric means;
   said means defining a plurality of sealed fluid chambers including a first sealed annular fluid chamber and a second sealed annular fluid chamber coaxial with and concentric with said first sealed annular fluid chamber, said first sealed annular fluid chamber being telescopically movable within said second sealed annular fluid chamber; and
   means for independently controlling the flow characteristic of the fluid within each of said plurality of sealed fluid chambers.

2. The spring of claim 1 wherein said first sealed annular fluid chamber is defined by a first cylindrical member connectable to one of the parts and a second cylindrical member coaxial with and concentric with said first cylindrical member, said first cylindrical member being telescopically movable within said second cylindrical member, said associated elastomeric means being connected between said first cylindrical member and said second cylindrical member.

3. The spring of claim 2 wherein said second sealed annular fluid chamber is defined by said second cylindrical member and a third cylindrical member coaxial with and concentric with said second cylindrical member and connectable to another one of the parts, said second cylindrical member being telescopically movable within said third cylindrical member, said associated elastomeric means being connected between said second cylindrical member and said third cylindrical member.

4. The spring of claim 3 wherein the fluid is an electrorheological fluid having a resistance to flow which varies as a function of an electric field acting on the fluid.

5. The spring of claim 4 wherein said means for independently controlling the resistance to flow of the fluid includes a first electrode connectable to a first electrical potential and disposed on said first cylindrical member within said first sealed annular fluid chamber, and a second electrode connectable to a second electrical potential and disposed on said second cylindrical member within said first sealed annular fluid chamber, a first electric field being established between said first electrode and said second electrode when the first electrical potential is applied to said first electrode and the second potential is applied to said second electrode, the resistance to flow of the electrorheological fluid increasing as the electrical potential between said first and second electrodes increases.

6. The spring of claim 5 wherein said means for independently controlling the resistance to flow of the fluid further includes a third electrode connectable to a third electrical potential and disposed on said second cylindrical member within said second sealed annular fluid chamber, and a fourth electrode connectable to a fourth electrical potential and disposed on said third cylindrical member within said second sealed annular fluid chamber, a second electric field being established between said third electrode and said fourth electrode when said third electrical potential is applied to said third electrode and the fourth potential is applied to said fourth electrode, the resistance to flow of the electrorheological fluid increasing as the electrical potential between said third and fourth electrodes increases.

7. A spring connectable between relatively movable parts to resist relative movement of the parts, said spring comprising:
   means defining a sealed fluid chamber filled with a fluid having a flow characteristic which varies in response to an energy field acting on the fluid, and including yieldable wall means at least partially defining said chamber and which enables a change in the shape of said chamber as the parts move relatively;
   said means defining a sealed fluid chamber includes a cylindrical hub connectable to one of the parts and coaxial with and telescopically movable within a cylindrical member connectable to another one of the parts, said yieldable wall means being connected between said cylindrical hub and said cylindrical member to define said sealed fluid chamber;
   the resistance to flow of the fluid being variable as a function of the strength of an energy field acting thereon, the fluid flowing to change shape as said chamber changes shape and thereby resisting relative movement of said parts;
   said first and second electrodes connectable to first and second electrical potentials, respectively, for applying the energy field to the fluid; and
   means for supporting said first and second electrodes for relative movement between one position in which said first and second electrodes have an area facing each other and another position in which said first and second electrodes have a greater area facing each other, the strength of the energy field between said first and second electrodes being greater as the area facing said first and second electrodes increases.

8. A spring of claim 7 wherein said yieldable wall means includes a first elastomeric spring member connected between said cylindrical hub and said cylindrical member to define an upper section of said sealed fluid chamber and a second elastomeric spring member connected between said cylindrical hub and said cylindrical member to define a lower section of said sealed fluid chamber.

9. The spring of claim 8 wherein the fluid is an electrorheological fluid having a resistance to flow which varies as a function of an electric field acting on the fluid.

10. A spring connectable between relatively movable parts to resist relative movement of the parts, said spring comprising:

a first electrode connectable to a first electrical potential;

a second electrode connectable to a second electrical potential;

an energy field being established between said first and second electrodes when said first electrode is connected to the first electrical potential and said second electrode is connected to the second electrical potential;

yieldable means at least partially defining a chamber between said first electrode and said second electrode, said chamber being filled with a fluid having a flow characteristic which varies in response to an energy field acting on the fluid, the resistance to flow of the fluid being variable as a function of the strength of the energy field between said first electrode and said second electrode;

supporting means for supporting said first and second electrodes for relative movement between one position in which said first and second electrodes have an area facing each other and another position in which said first and second electrodes have a greater area facing each other, the strength of the energy field between said first and second electrodes being greater as the area facing said first and second electrodes increases.

11. The spring of claim 10 wherein said supporting means includes an outer cylindrical member and an inner cylindrical member coaxial with and telescopically movable within said outer cylindrical member, said first electrode being disposed on the inner periphery of said outer cylindrical member, said second electrode being disposed on the outer periphery of said inner cylindrical member.

12. The spring of claim 11 wherein said yieldable means includes an elastomeric member connected between the inner periphery of said outer cylindrical member and the outer periphery of said inner cylindrical member, said elastomeric member deforming when one of the parts moves relative to another one of the parts, said first electrode and said second electrode moving relative to each other when said elastomeric member deforms in response to one part moving relative to another part.

13. The spring of claim 10 further including a third electrode connectable to a third electrical potential, a fourth electrode connectable to a fourth electrical potential, second supporting means for supporting said third and fourth electrodes, the energy field between said third electrode and said fourth electrode being established when said third electrode is connected to the third electrical potential and said fourth electrode is connected to the fourth electrical potential, and second yieldable means at least partially defining a second chamber between said third electrode and said fourth electrode, said second chamber being filled with a fluid having a flow characteristic which varies in response to the energy field acting on the fluid, the resistance to flow of the fluid being variable as a function of the strength of the energy field between said third electrode and said fourth electrode.

14. The spring of claim 13 wherein said second supporting means supports said third and fourth electrodes for relative movement between one position in which said third and fourth electrodes have an area facing each other and another position in which said third and fourth electrodes have a greater area facing each other, the strength of the energy field between said third and fourth electrodes being greater as the area facing said third and fourth electrodes increases.

15. The spring of claim 14 wherein the fluid is an electrorheological fluid having a resistance to flow which varies as a function of an electric field acting on the fluid.

16. A spring connectable between relatively movable parts to resist relative movement of the parts, said spring comprising:

a cylindrical hub connectable to one of the parts;

a first cylindrical member connectable to another one of the parts, said first cylindrical member being coaxial with and concentric around said cylindrical hub;

a first electrode connectable to a first electrical potential and disposed on the outer periphery of said cylindrical hub;

a second electrode connectable to a second electrical potential and disposed on the inner periphery of said first cylindrical member, an energy field being established between said first electrode and said second electrode when said first electrode is connected to the first electrical potential and said second electrode is connected to the second electrical potential;

first elastomeric means connected between said cylindrical hub and said first cylindrical member to at least partially define a first chamber between said cylindrical hub and said first cylindrical member, said first chamber being filled with a fluid having a flow characteristic which varies in response to the energy field acting on the fluid, the resistance to flow of the fluid increasing as the strength of the energy field between said first electrode and said second electrode increases, the resistance to axial movement or angular movement or lateral movement or torsional movement or a combination thereof between said cylindrical hub and said first cylindrical member increasing as the resistance to flow of the fluid increases.

17. A spring of claim 16 wherein said first elastomeric means includes a first portion connected between said cylindrical hub and said first cylindrical member to form an upper section of said first chamber, and a second portion connected between said cylindrical hub and said first cylindrical member to form a lower section of said first chamber, said first and second portions of said first elastomeric means deforming in response to axial movement or angular movement or lateral movement or torsional movement or a combination thereof between said cylindrical hub and said first cylindrical member.

18. A spring of claim 16 further including a second cylindrical member coaxial with and concentric around said cylindrical hub and said first cylindrical member, said second cylindrical member being connectable to another one of the parts and second elastomeric mean connected between the outer periphery of said first cylindrical member and the inner periphery of said second cylindrical member to at least partially define a second chamber between said first cylindrical member and said second cylindrical member, said second chamber being filled with a fluid having a flow characteristic which varies in response to an energy field acting on the fluid.

19. A spring of claim 18 wherein said second elastomeric means includes a first portion connected between said first cylindrical member and said second cylindrical member to form one section of said second chamber, and a second portion connected between said first cylindrical member and said second cylindrical member to form another section of said second chamber, said first and second portions of said second elastomeric means deforming in response to axial movement or angular movement or lateral movement or torsional movement or a combination thereof between said first cylindrical member and said second cylindrical member.

20. A spring of claim 18 further including a third electrode connectable to a third electrical potential and disposed on the outer periphery of said first cylindrical member, and a fourth electrode connectable to a fourth electrical potential and disposed on the inner periphery of said second cylindrical member, the energy field acting on the fluid in said second chamber being established between said third electrode and said fourth electrode when said third electrode is connected to the third electrical potential and said fourth electrode is connected to the fourth electrical potential.

21. A spring connectable between relatively movable parts to resist relative movement of the parts, said spring comprising:
means defining a sealed fluid chamber filled with a fluid having a flow characteristic which varies in response to an energy field acting on the fluid, and including yieldable wall means at least partially defining said chamber and which enables a change in the shape of said chamber as the parts move relatively;
the resistance to flow of the fluid being variable as a function of the strength of an energy field acting thereon, the fluid flowing to change shape as said chamber changes shape and thereby resisting relative movement of said parts;
first and second electrodes connectable to first and second electrical potentials, respectively, for applying the energy field to the fluid; and
means for supporting said first and second electrodes for relative movement between one position in which said first and second electrodes have an area facing each other and another position in which said first and second electrodes have a greater area facing each other, the strength of the energy field between said first and second electrodes being greater as the area facing said first and second electrodes increases. 287

* * * * *